United States Patent
Waldt et al.

(10) Patent No.: US 10,690,189 B2
(45) Date of Patent: Jun. 23, 2020

(54) STEERING GEAR BEARING ARRANGEMENT

(71) Applicant: Ford Global Technologies, LLC, Dearborn, MI (US)

(72) Inventors: Alexander Ein Waldt, Köln (DE); Gerhard Friederich, Bornheim (DE); Hendrik Buer, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/199,858

(22) Filed: Nov. 26, 2018

(65) Prior Publication Data
US 2019/0162236 A1 May 30, 2019

(30) Foreign Application Priority Data
Nov. 27, 2017 (DE) .................. 10 2017 221 153

(51) Int. Cl.
| | |
|---|---|
| *F16C 35/077* | (2006.01) |
| *B62D 5/04* | (2006.01) |
| *F16C 19/16* | (2006.01) |
| *F16C 23/08* | (2006.01) |

(Continued)

(52) U.S. Cl.
CPC .......... *F16C 35/077* (2013.01); *B62D 5/0409* (2013.01); *B62D 5/0421* (2013.01); *B62D 5/0445* (2013.01); *F16C 19/163* (2013.01); *F16C 23/08* (2013.01); *F16C 33/581* (2013.01); *F16C 33/588* (2013.01);
(Continued)

(58) Field of Classification Search
CPC ...... F16C 19/163; F16C 23/08; F16C 33/581; F16C 33/588; F16C 35/077; F16C 2226/70; F16C 2226/72; F16C 2240/42; F16C 2326/24; F16C 2361/24; B62D 5/0409; B62D 5/0421; B62D 5/0445; F16H 2057/0213
USPC ................ 384/537, 435, 564–565, 559, 561; 310/75 R, 83, 99; 180/442–444, 447; 74/388 PS
See application file for complete search history.

(56) References Cited

U.S. PATENT DOCUMENTS

| | | | | |
|---|---|---|---|---|
| 1,510,303 | A | * 9/1924 | Bugatti | ................ F16C 27/066 384/535 |
| 4,227,104 | A | * 10/1980 | Hamman | ................ F16C 35/02 310/75 R |

(Continued)

FOREIGN PATENT DOCUMENTS

| | | |
|---|---|---|
| DE | 102007023456 A1 | 11/2008 |
| DE | 102008042281 A1 | 3/2010 |

(Continued)

*Primary Examiner* — Marcus Charles
(74) *Attorney, Agent, or Firm* — Raymond L. Coppiellie; Burgess Law Office, PLLC

(57) ABSTRACT

A bearing arrangement for supporting an endless screw of a steering gear on a gear housing of the steering gear. The bearing arrangement including a radial bearing rotationally connected to the endless screw. A resilient retention element connecting the radial bearing to the gear housing. The retention element is connected at the radial bearing side to an outer face of an outer bearing ring and fixed to the outer face of the outer bearing ring in an axially non-movable manner with respect to a longitudinal center axis of the radial bearing.

17 Claims, 6 Drawing Sheets

(51) Int. Cl.
*F16C 33/58* (2006.01)
*F16H 57/021* (2012.01)

(52) U.S. Cl.
CPC ...... *F16C 2226/70* (2013.01); *F16C 2226/72* (2013.01); *F16C 2326/24* (2013.01); *F16H 2057/0213* (2013.01)

(56) References Cited

U.S. PATENT DOCUMENTS

| | | | | |
|---|---|---|---|---|
| 4,572,979 | A * | 2/1986 | Haar | H01R 39/383 310/239 |
| 6,491,131 | B1 * | 12/2002 | Appleyard | B62D 5/0409 180/444 |
| 6,880,231 | B2 * | 4/2005 | Campbell | H02K 1/30 29/596 |
| 7,245,053 | B2 * | 7/2007 | Pettitt | H02K 7/081 310/75 R |
| 7,771,126 | B2 * | 8/2010 | Faass | B64C 27/14 248/580 |
| 8,567,553 | B2 | 10/2013 | Hamakita et al. | |
| 8,667,858 | B2 * | 3/2014 | Fuechsel | B62D 5/0409 74/388 PS |
| 9,102,351 | B2 | 8/2015 | Ishii et al. | |
| 9,488,219 | B2 * | 11/2016 | Fuechsel | B62D 5/0409 |
| 9,534,630 | B2 * | 1/2017 | Hafermalz | F16H 57/039 |
| 2007/0102228 | A1 * | 5/2007 | Shiina | B62D 5/0409 180/444 |
| 2014/0224567 | A1 * | 8/2014 | Kiforiuk | B62D 5/0448 180/444 |
| 2016/0176438 | A1 * | 6/2016 | Suzuki | B62D 5/0403 180/444 |
| 2017/0144695 | A1 * | 5/2017 | Segawa | F16C 23/08 |

FOREIGN PATENT DOCUMENTS

| | | | | |
|---|---|---|---|---|
| DE | 102009015025 B4 | 4/2010 | | |
| DE | 102009002940 A1 * | 11/2010 | ........... | B62D 5/0409 |
| DE | 202016103802 U1 | 7/2015 | | |
| DE | 102017207708 A1 * | 11/2018 | ........... | B62D 5/0409 |
| JP | 2014111442 A * | 6/2014 | ............. | F16C 35/07 |
| WO | WO-2013005713 A1 * | 1/2013 | ............. | F16C 35/067 |

* cited by examiner

US 10,690,189 B2

STEERING GEAR BEARING ARRANGEMENT

CROSS-REFERENCE TO RELATED APPLICATIONS

Not Applicable.

BACKGROUND OF THE INVENTION

1. Field of the Invention

The present invention relates generally to a steering gear; and more specifically to a steering gear having a gear housing, an endless screw arranged in the gear housing, and a bearing arrangement rotatably supporting the endless screw on the gear housing.

2. Description of Related Art

Motor vehicle electrical power-assisted steering systems reduce needed force for a steering wheel of the vehicle. The electrical power-assisted steering system supports a driver during steering by reinforcing the steering force applied by the driver using an electric motor of the electrical power-assisted steering system. The electric motor drives a steering gear of the electrical power-assisted steering system, generally a worm gear; in particular, the electric motor drives an endless screw of the steering gear engaged with a worm wheel. The worm wheel connected to a steering column of the motor vehicle.

The endless screw of the steering gear conventionally supported in a rotatable manner at one end thereof by a fixed bearing and at another end by a movable bearing on a gear housing of the steering gear. A force acts on and pretensions the endless screw toward the worm wheel, in the region of the movable bearing or the fixed bearing, to maintain contact between the thread of the endless screw and the tooth arrangement of the worm wheel. Optimally adjusting the contact force between the endless screw and the worm wheel reduces the friction between the endless screw and the worm wheel and correspondingly reduces NVH properties (Noise/Vibration/Harshness) properties and improves steering gear durability.

Different embodiments of bearings used with an endless screw of a steering gear in a gear housing of the steering gear are known. One embodiment uses, at the drive side, a fixed bearing with the endless screw pretensioned toward the worm wheel. The fixed bearing has a radial bearing arranged in a radial bearing housing produced from sheet metal. The radial bearing housing connects the radial bearing to the gear housing. The radial bearing housing has a portion having resilient properties compensating for tolerances and effects caused by the environment, for example, temperature/moisture and wear. A movable bearing retains the other end of the endless screw and can be constructed in a manner that limits movability of the endless screw to reduce NVH effects, and maintain stable engagement of the endless screw and the worm wheel over the service-life of the steering gear.

SUMMARY OF THE INVENTION

A steering gear bearing system including a radial bearing having an outer bearing ring, a recess in an outer surface of the outer bearing ring wherein the recess forms a shoulder. A resilient retention element engages the shoulder and is fixed against relative axial movement, movement between the outer bearing ring and the retention element along the longitudinal center axis of the radial bearing.

Further areas of applicability of the present invention will become apparent from the detailed description provided. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1a is a schematic illustration of a conventional, prior art steering gear.

FIG. 1b is a schematic illustration of a detail of the conventional, prior art steering gear shown in FIG. 1a.

FIG. 2a is a schematic cross-sectional view of an embodiment of a bearing arrangement according to the invention.

FIG. 2b is a schematic end view of the bearing arrangement in FIG. 2a.

FIG. 5b is a schematic, partial, cross-sectional view of the bearing arrangement in FIG. 5a.

FIG. 6b is a schematic, partial cross-sectional view of a detail of the bearing arrangement shown FIG. 6a.

DETAILED DESCRIPTION OF THE PREFERRED EMBODIMENTS

Figures 1A, 1B:
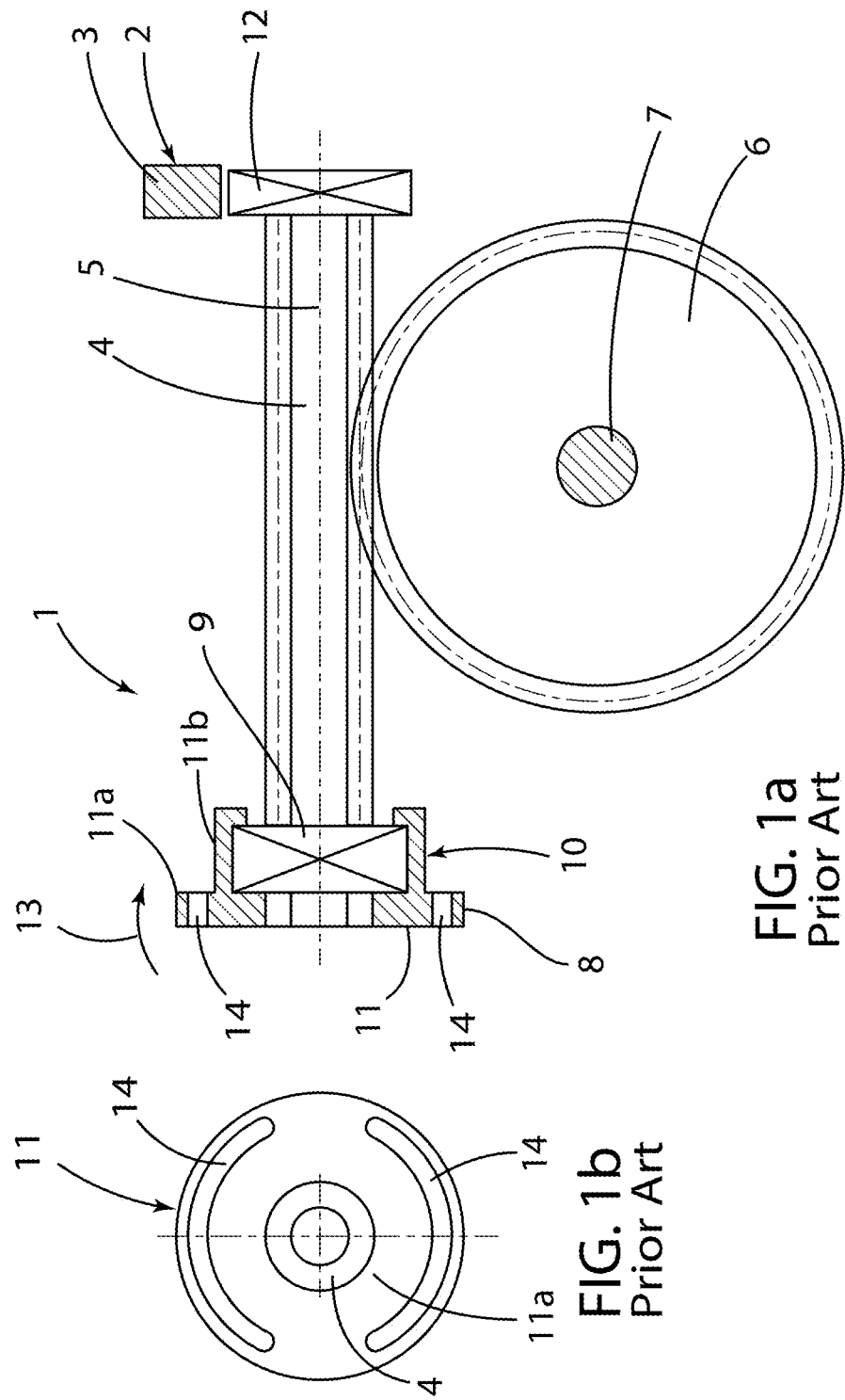

The following description of the preferred embodiment(s) is merely exemplary in nature and is in no way intended to limit the invention, its application, or uses. In the different Figures, the same components are always provided with the same reference numerals, for which reason they are also generally only described once.

FIGS. 1a and 1b are schematic illustrations of a conventional steering gear 1 for an electrical power-assisted steering system (not shown) of a vehicle. The steering gear 1 is constructed as a worm gear.

The steering gear 1 has a gear housing, seen schematically at 2, illustrated in FIG. 1a as having a projection 3. The steering gear 1 includes an endless screw 4 arranged in the gear housing 2 and rotatably supported about its longitudinal axis 5. The steering gear 1 further has a worm wheel 6 engaged with the endless screw 4 and rotatably supported via an axle 7. Rotational movements of the axle 7 and/or endless screw 4 can be detected by sensors to control the electrical power-assisted steering system.

The steering gear 1 has a fixed bearing arrangement 8 that rotatably supports the endless screw 4 on the gear housing 2. The fixed bearing arrangement 8 includes a radial bearing housing 10 receiving a fixed radial bearing 9. The radial bearing housing 10 includes a retention disk 11 having disk portion 11a and a bearing cup portion 11b. The disc portion 11a connecting the fixed bearing arrangement 8 to the gear housing 2 and the bearing cup 11b enclosing the fixed radial bearing 9. The disk portion 11a includes openings 14 for adjusting the resilient properties of the disk portion 11a. Resilient deformation of the disc portion 11a pretensions the endless screw 4 against the worm wheel. The disk portion 11a produces a tilting moment, indicated by the arrow 13, on the radial bearing.

The steering gear 1 has a movable bearing 12 that also rotatably supports the endless screw 4. The limiting projection, of the gear housing 2, supports the movable bearing 12 and limits movability of the endless screw 4 away from the worm wheel 6.

Figures 2A, 2B:
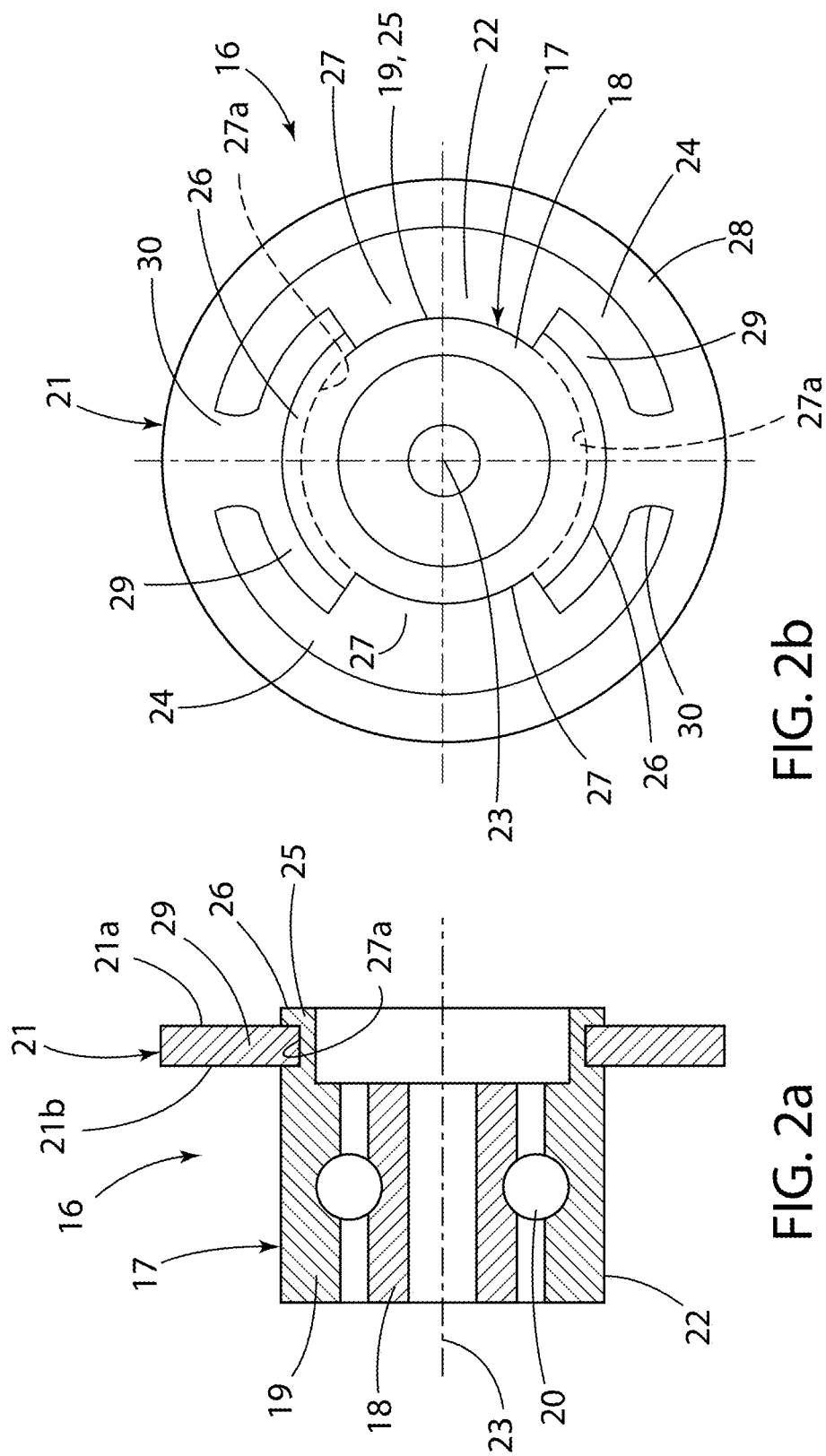

FIGS. 2a and 2b are schematic cross-sectional views of one embodiment of a bearing arrangement 16 according to the invention for supporting an endless screw of a steering gear on a gear housing of the steering gear.

The bearing arrangement 16 includes a radial bearing 17 connected to the endless screw in a rotationally secure manner. The radial bearing 17 may be a radial roller bearing. The radial bearing 17 has an inner bearing ring 18 connected to the endless screw in a play-free manner, an outer bearing ring 19 and roller members 20 arranged between the inner bearing ring 18 and the outer bearing ring 19.

The bearing arrangement 16 includes a resiliently constructed retention element 21 that connects the radial bearing 17 to the gear housing. The retention element 21 connected to an outer face 22 of the outer bearing ring 19. The retention element 21 fixed in an axially non-movable manner to the outer face 22 of the outer bearing ring 19; specifically, there is no relative movement between the retention element 21 and the outer bearing ring 19 along or in the direction of a longitudinal center axis 23 of the radial bearing 17.

The retention element 21 having a disk-like, annular shape arranged peripherally on the radial bearing 17. The retention element 21 may be produced from a spring steel. The retention element 21 includes two partially peripheral material recesses 24. FIG. 2b shows the retention element 21 and the outer bearing ring 19 form a bayonet-type or insert, twist, and lock closure.

The outer bearing ring 19 has an axially projecting axial end portion 25 with a reduced outer diameter or peripheral recess 27, on which the retention element 21 is fixed in an axially, in the direction of the longitudinal center axis 23, non-movable manner. Two radially outwardly directed, partially peripheral collars 26 are arranged in a peripherally offset manner relative to each other, on a free end portion of the axial end portion 25. The collars 26 cooperating with the recess 27 to form grooves 27a.

FIG. 2b is a schematic illustration of the bearing arrangement 16 in FIG. 2a. The two mutually diametrically opposed collars 26, between which partially peripheral recesses 27 are constructed, as shown the recesses 27 extend radially inward towards the longitudinal center axis 23 of the radial bearing 17. The retention element 21 includes a continuous outer ring 28, two inner ring portions 29 arranged in a partially peripheral manner and peripherally offset relative to each other complimentary to the collars 26, and two connection portions 30 connecting the inner ring portions 29 to the outer ring 28.

FIG. 2a shows the retention element 21 fixed to the outer bearing ring 19 wherein no relative axial movement exists between the element 21 and outer ring 19. As used herein axial movement means movement in the direction of or along the longitudinal center axis 23 of the radial bearing 17.

In the disclosed embodiment, a bayonet-type connection is used to fix the retention element 21 to the outer bearing ring 19. Initially, the retention element 21 is rotated 90° from the position in FIG. 2b, about the longitudinal center axis 23 of the radial bearing 17 so the inner ring portions 29 can be guided axially through the recesses 27 between the collars 26 and moved axially along the outer bearing ring 19 until the inner ring portions 29 have passed the collars 26. When past the collars 26, and adjacent the grooves 27a, the retention element 21 is rotated 90° about the longitudinal center axis 23 of the radial bearing 17 into the position in FIG. 2b wherein the inner ring portions 29 are in the grooves 27a. FIG. 2a illustrates the inner face 21a and outer face 21b of the retention element 21 engage or contact respective inner and outer faces of the groove 27a. As used herein "inner face" means the face, side or surface facing or closest to the endless screw, and "outer face" means the face or surface facing the roller members 20 of the bearing 17; the face, side, or surface facing away from or furthest from the endless screw.

The retention element 21 is fixed in the position in FIG. 2b relative to the outer bearing ring 19 using a rotation prevention member or stop, preventing further rotational movement of the inner ring portion 29 about the longitudinal center axis 23 of the radial bearing 17.

Figure 3:
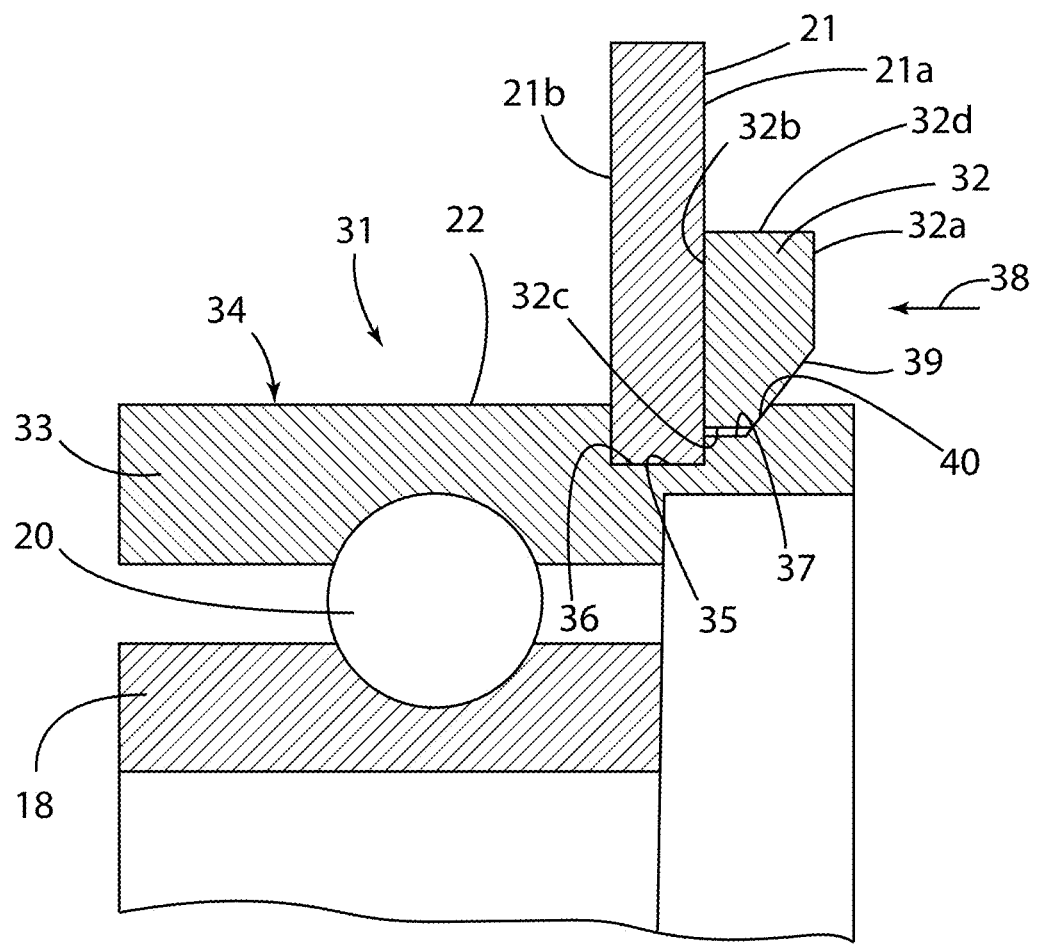
FIG. 3 is a schematic, partial, cross-sectional view of a portion of an additional embodiment of a bearing arrangement according to the invention.

FIG. 3 is a schematic cross-section of a portion of an additional embodiment of a retention element 21 for supporting a bearing arrangement 31 of an endless screw of a steering gear on a gear housing of the steering gear.

The bearing arrangement 31 differs from the embodiment in FIGS. 2a and 2b because it uses a securing ring 32 engaging a groove 35 constructed peripherally in the outer face 22 of the outer bearing ring 33 of the radial bearing 34. The securing ring 32 arranged directly adjacent to the retention element 21 at the inner face 21a of the retention element 21; between the retention element 21 and the endless screw and, as shown in FIG. 3, to the right of the retention element 21. The retention element 21 engages a deeper depth or portion 36 of the groove 35 wherein the securing ring 32 is in a shallower depth or portion 37 of the groove 35.

The securing ring 32 includes an axially inner face 32a, an axially outer face 32b, a radially inner surface 32c, and a radially outer surface 32d. A chamfer 39 extends from the radially inner surface 32c to the axially inner face 32a. A complimentary chamfer 40, part of the groove 35 and adjacent the shallower portion 37, cooperates with the chamfer 39 on the outer bearing ring 33. The chamfer 40 extending from the shallower depth or portion 37 of the groove 35 to the outer face 22 of the outer bearing ring 33. The securing ring 32 is resiliently deformed in the position in FIG. 3; it exerts an inwardly biasing and correspondingly an axial force on the retention element 21. As the securing ring 32 presses inward, the chamfer 39 of the securing ring 32 presses against the chamfer 40 the securing ring 32 and generates an axial force, see arrow 38, that acts on and axially pretensions the retention element 21; it fixes the retention element 21 against axial movement in the groove 35.

Figure 4:
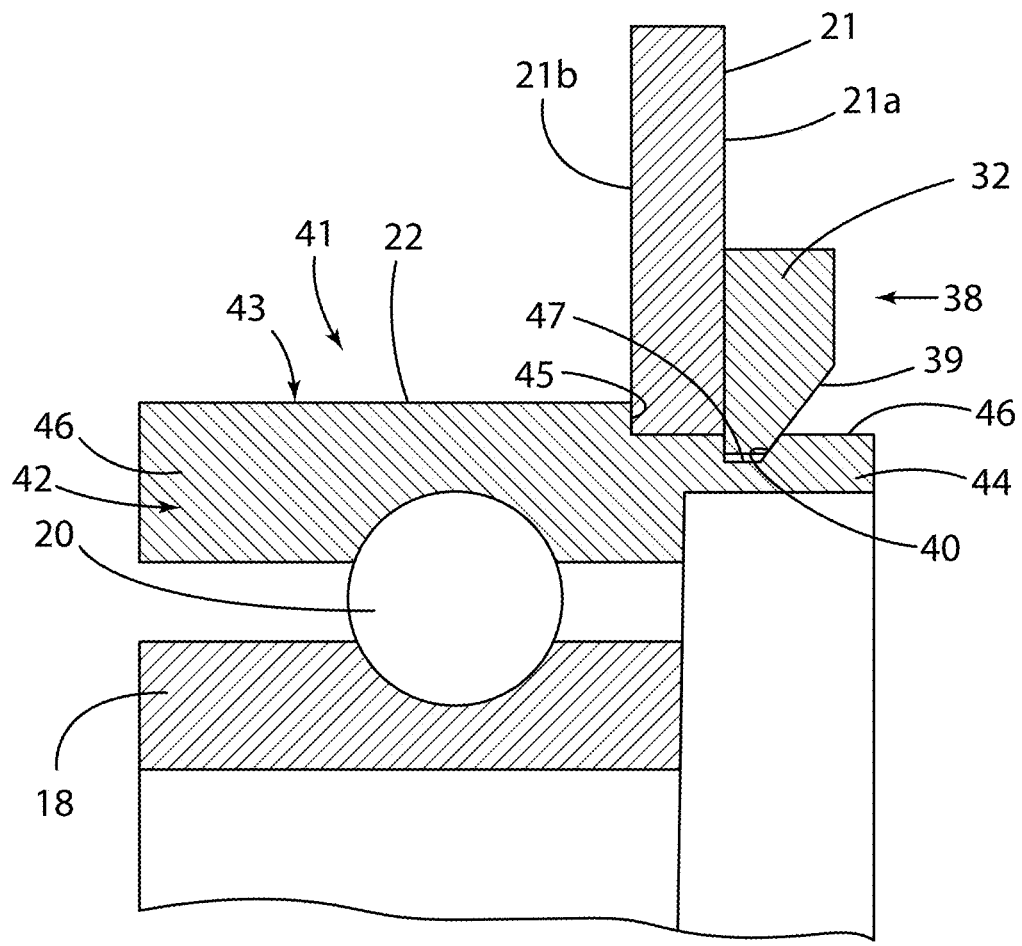
FIG. 4 is a schematic, partial, cross-sectional view of a portion of an additional embodiment of a bearing arrangement according to the invention.

FIG. 4 is a schematic cross-section of a portion of an additional embodiment of a bearing arrangement 41 according to the invention for supporting an endless screw of a steering gear on a gear housing of the steering gear.

The bearing arrangement 41 differs in that the outer bearing ring 42 of the radial bearing 43 has an axially projecting axial end portion 44, facing the endless screw, having an outer face 46, with an outer diameter smaller than the diameter of the outer face 22. The difference in diameter forming a shoulder 45 between the respective outer face 22, 46. As shown the retention element 21 fits on or over the reduced or smaller diameter axial end portion 44 of the outer bearing ring 42 with the outer face 21*b* supported axially on or positioned against the shoulder 45.

A securing ring 32 positioned adjacent the inner face 21*a* of the retention element 21, to the right of the retention element 21 in FIG. 4, engages groove 47 formed in the reduced or smaller diameter axial end portion 44 of the outer bearing ring 42. The securing ring 32 includes a chamfer 39 engaging a complimentary chamfer 40 in the portion of the groove 47. The inwardly biased securing ring 32 produces a pretensioned axial force, in the direction 38, pressing the securing ring 32 against the shoulder 45 and fixing the retention element 21 against relative axial movement between the outer bearing ring 42 and the retention element 21 in the direction of or along a longitudinal center axis of the radial bearing. An outer diameter of the securing ring 32 is greater than an inner diameter of the retention element 21.

Figure 5A:
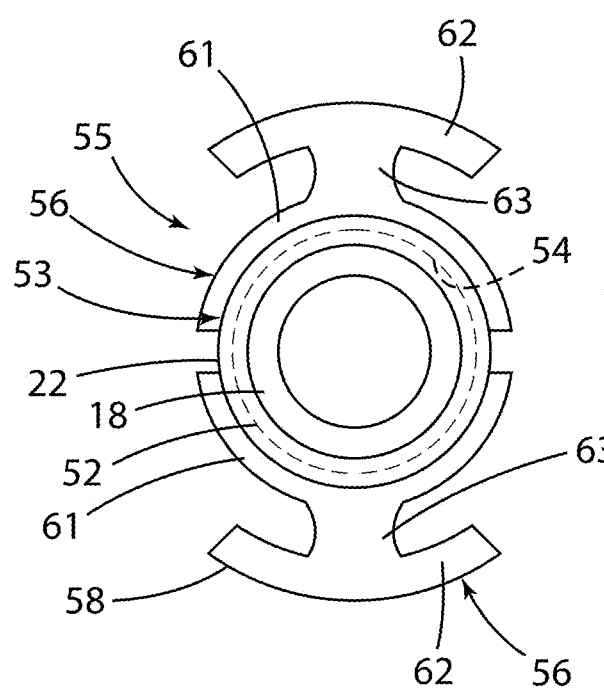
FIG. 5a is a schematic, partial, end view of an additional embodiment of a bearing arrangement according to the invention.

FIG. 5*a* is a schematic cross-section of an additional embodiment of a steering gear 48 according to the invention for an electrical power-assisted steering system of a vehicle not shown. The steering gear 48 is constructed as a worm gear.

Figure 5B:
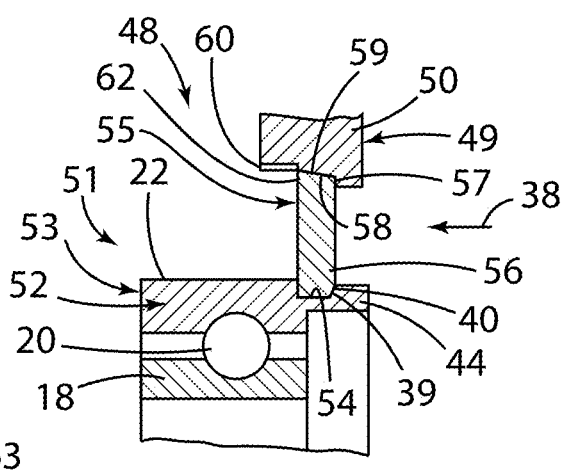

The steering gear 48 has a gear housing 49, shown in FIG. 5*b* as a bearing projection 50. As with the previous embodiments, the steering gear 48 includes an endless screw arranged in the gear housing 49 and rotatably supported about the longitudinal axis thereof. The steering gear 48 includes a worm wheel engaged with the endless screw and rotatably supported via an axle. Rotational movements of the axle can be detected by sensors to be able to control the electrical power-assisted steering system.

The steering gear 48 has a bearing arrangement 51 that rotatably supports one end of the endless screw in or on the gear housing 49. The steering gear 48 may have a movable bearing supporting an opposite end of the endless screw. To limit movability of the endless screw away from the worm wheel, the gear housing 49 may include a limiting projection adjacent or supporting the movable bearing. The steering gear 48 can be constructed as shown FIG. 1*a* regarding the movable bearing.

A peripheral groove 54 formed in the outer covering face 22 of the outer bearing ring 52, or the axial end portion 44 of the outer bearing ring 52 of the radial bearing 53, receives a retention element 55 in a positive-locking manner—fixed against relative axial movement between the retention element 55 and outer bearing ring 52. The retention element 55 includes a retention element portion 56 having a chamfer 39 adjacent an inner face 56*a* thereof. The peripheral groove 54 includes a chamfer 40, complementary to the chamfer 39 on the retention element portion 56. The respective chamfers 39, 40 cooperate to provide an axial force, see the arrow 38.

The retention element 55 has two retention element portions 56 arranged on the radial bearing 53 in a peripherally offset manner relative to each other, FIG. 5*a* shows only one retention element portion 56. The complete structure of the retention element 55 is shown in FIG. 5*b*.

The gear housing 49 or the bearing projection 50 includes a shoulder 57 arranged in an at least partially peripheral manner axially abutting or engaging an inner side 56*a* of the retention element 55. A radial outer surface or face 58 of the retention element 55, or retention element portion 56, tapers radially inward from the outer side 56*b* to the inner side 56*a*. A contact face 59 of the gear housing 49 or bearing projection 50 contacts the outer surface or face 58 of the retention element 55, or retention element portion 56, and tapers with the outer covering face 58 of the retention element 55 or retention element portion 56, toward the shoulder 57. A portion of the contact face 59, facing away from the endless screw, includes an inner thread 60, wherein a threaded component, such as a retainer nut having an outer thread, screws into the gear housing 49 to pretension the retention element 55, or the retention element portion 56, against the shoulder 57. The retention element portion 56 is pretensioned by the contact between the outer face 58 of the retention element portion 56 and the contact face 59 acting radially inwardly against the radial bearing 53.

FIG. 5*a* is a schematic illustration of the bearing arrangement 51 in FIG. 5*b*. The two retention element portions 56, with the same structure, are shown. Each retention element portion 56 has an inner ring portion 61 engaging the groove 54 in the outer bearing ring 52 or the axial end portion 44 of the outer bearing ring 52. The retention element 55 includes an outer ring portion 62 at the radially outer side, an inner ring portion 61 spaced from said outer ring portion 62, and a connection portion 63 connecting the inner ring portion 61 to the outer ring portion 62. The respective inner ring portion 61 extends over an angle, or periphery, greater than the respective outer ring portion 62.

Figure 5C:
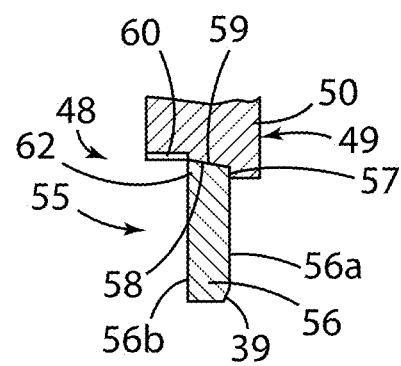
FIG. 5c is a schematic, partial, enlarged, cross-section view of the bearing arrangement in FIG. 5b.

FIG. 5*c* is a schematic cross-section of a detail of the steering gear 48 in FIG. 5*a* in the outer ring portion 62 of the retention element engaging the gear housing 49. The identically directed tapering of the outer covering face 58 of the retention element portion 56 and the contact face 59 of the bearing projection 50 are shown.

Figure 6A:
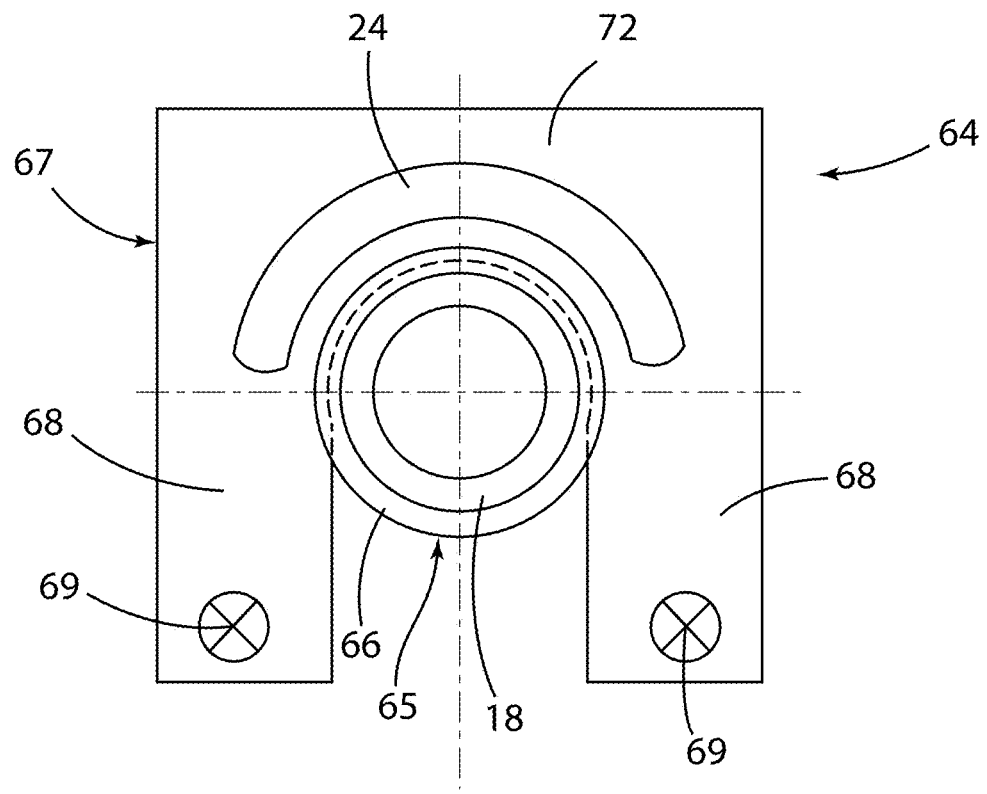
FIG. 6a is a schematic, end view of an additional embodiment of a bearing arrangement according to the invention.

FIG. 6*a* is a schematic illustration of an additional embodiment of a bearing arrangement 64 according to the invention for supporting an endless screw of a steering gear on a gear housing of the steering gear.

The bearing arrangement 64 has a radial bearing 65 connected to the endless screw in a rotationally secure manner and is a radial roller bearing. The radial bearing 65 includes an inner bearing ring 18, connected to the endless screw in a play-free manner, an outer bearing ring 66, and roller members (not shown) arranged between the inner bearing ring 18 and the outer bearing ring 66.

The bearing arrangement 64 includes a resiliently constructed retention element 67 connecting the radial bearing 65 to the gear housing. The retention element 67 connects only at the radial bearing side to an outer covering face of the outer bearing ring 66 in FIG. 6*b*. The retention element 67 fixed in an axially non-movable manner to the outer covering face of the outer bearing ring 66, there is no relative movement between the two along or in the direction of a longitudinal center axis 23 of the radial bearing 65. The structure of the outer bearing ring 66 in FIG. 6*b*.

The retention element 67 is constructed in a disk-like manner and arranged in a partially peripheral manner on the radial bearing 65. The retention element 67 is produced completely from a spring steel. The retention element 67 includes a partially peripheral material recess 24. In one example, the retention element 67 is a U-shaped member having two mutually connected members 68, the free end portions thereof being fixed to fixing locations 69 on the gear housing.

Figure 6B:
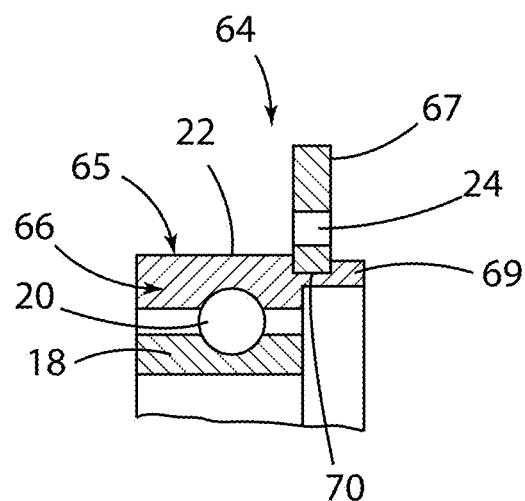

FIG. 6*b* is a schematic cross-section of a detail of the bearing arrangement 64 in FIG. 6*a*. The retention element 67 engages, in a positive-locking manner, a peripheral groove 70 formed in the outer covering face 22 of the outer bearing ring 66. The groove 70 is arranged on an axial end portion 69 of the outer bearing ring 66 that projects axially toward the endless screw.

The embodiments show the retention element 21 connected to the outer face 22 of the outer bearing ring of the radial bearing. The retention element 21 and the outer bearing ring joined or connected so the retention element 21 is fixed to the outer face 22 of the outer bearing ring in an axially non-movable manner, the retention element 21 does not move axially on the outer bearing ring, along or in the direction of the longitudinal center axis 23 of the radial bearing. Preferably, the retention element 21 is releasably fixed to the outer face 22 of the outer bearing ring; i.e., removal of the retention does not require destruction, so the assembly of the bearing arrangement is simplified and, for example, a simple exchange of components of the bearing arrangement is possible.

As illustrated, because the radial bearing is not arranged in a radial bearing housing or case like the prior art, it provides an advantage of a desired rigidity or movability of the radial bearing and reliability over the service life of the bearing arrangement. Conventional or prior art radial bearing housings 10 have disadvantages, for example, difficulty in limiting freedom from play—movement between the radial bearing and the radial bearing housing resulting from flexion—the action of bending or condition of being bent. The play necessarily between the radial bearing and the radial bearing housing can limit desired deformations of the bearing. The rigidity of the radial bearing housing may change over the service-life of a corresponding conventional bearing arrangement so the properties of the conventional bearing arrangement can deteriorate. Pretensioning a conventional bearing arrangement is difficult, in particular over the operating range of the endless screw. The presence of a radial bearing housing limits the available structural space, whereby the function of the bearing can be limited.

The bearing arrangement 16 according to the invention replaces a conventional radial bearing housing 10 with a retention element 11, via which the radial bearing can be connected to the gear housing. Dispensing with a conventional radial bearing housing 10, reduces or eliminates fluctuations of rigidity the radial bearing housing 10 and provides a pretensioning in the bearing arrangement 16 according to the invention. Fluctuation of play of a radial bearing housing need not be considered with the bearing arrangement 16 according to the invention; particularly, because in the bearing arrangement 16 according to the invention there is no play between the radial bearing 17 and the retention element 21. The structural space resulting from the absence of a radial bearing housing 10 can provide a radial bearing with greater productivity that withstands high tilting moments or radial forces brought about by the pretensioning, produced with the retention element, and maintains operating forces of the pretensioning within the mutually engaging tooth arrangements of the endless screw and worm wheel. As disclosed in the embodiments, the radial bearing and the retention element are connected to each other without play, with the rigidity of the connection kept constant over the service-life of the bearing arrangement. Unlike a conventional bearing arrangement with a radial bearing housing, the bearing arrangement according to the invention requires no additional pretensioned resilient element to maintain pretensioning over the service-life of the bearing arrangement.

Friction within the radial bearing can be kept constant with the bearing arrangement according to the invention because the radial bearing is not deformed by a radial bearing housing, improving the durability of the bearing arrangement. The bearing arrangement according to the invention improves the positioning of the radial bearing or the endless screw relative to the worm wheel, ensuring constant properties of the bearing arrangement by overcoming fluctuations regarding the bearing position. The bearing arrangement according to the invention can be produced with less complexity and using fewer components, resulting in cost and weight reduction.

The radial bearing can be a radial roller bearing or radial sliding bearing. In addition, the radial bearing may function as an axial bearing securing the endless screw against movements along the longitudinal center axis thereof. The radial bearing includes an inner bearing ring connected to the endless screw in a rotationally secure manner. In one example, the endless screw may have a threaded portion cooperating with the worm wheel of the steering gear and bearing journals that axially adjoin the threaded portion, with one bearing journal connected to the inner bearing ring in a rotationally secure manner.

The retention element 21 may be produced from a metal or a metal alloy, in particular a steel. Resilient deformation of the retention element in a functional, fitted state produces pretensioning of the radial bearing and the endless screw toward the worm wheel. The material properties of the retention element, the geometric configuration of the retention element, the position of the worm shaft axis relative to the wheel axis, and the axial positioning of the retention element relative to the radial bearing can all adjust the pretensioning. For example, the retention element can be connected to the radial bearing eccentrically. The retention element may have resilient webs arranged or distributed over the periphery thereof and relative to each other wherein the respective position in a peripheral direction adjusts the properties of the retention element in the rigidity plane.

While disclosed for use with a steering gear, the bearing arrangement according to the invention can be used with a seat adjustment gear, a single wheel actuation of wheels with rotation about the vertical wheel axis, a gear mechanism of a steer-by-wire force feedback unit, a window raising gear mechanism, a machine tool, or the like.

According to an advantageous embodiment, a bayonet-type closure joints or fixes the retention element 21 and the outer bearing ring. The retention element 21 connects to the radial bearing 17 in a simple and secure manner permanently and releasably without being destroyed. Producing the bayonet-type closure includes at least one partially peripheral, radially outwardly directed collar 26 arranged on the outer bearing ring 19, engaged behind after the retention element 21 fits into the recesses 27 on the outer bearing ring 19 wherein subsequent rotation of the retention element 21 about a longitudinal center axis 23 of the radial bearing 17 relative to the outer bearing ring 19 causes a radially inwardly directed portion 29 of the retention element 21 to fix the retention element 21 in an axially non-movable manner to the outer face 22 of the outer bearing ring 19. A rotation prevention member, prevents the retention element 21 from rotating relative to the outer bearing ring 19 in an undesirable manner, keeping the bayonet-type closure from loosening.

In another embodiment, the bearing arrangement 31 includes a securing ring 32 engaging a groove 35 formed peripherally in the outer face 22 of the outer bearing ring 33. The sealing ring 32 arranged at a side of the retention element 21 facing a thread of the endless screw adjacent to the retention element 21. The securing ring 32 is one mechanism ensuring that the bayonet-type joint between the retention element 21 and the outer bearing ring 33, shown in FIG. 3, is secure and does not release the retention element from the outer bearing ring 33 in an undesirable manner. The securing ring 32 may further perform the function of a rotation prevention member. The securing ring 32 may be produced from a metal or a metal alloy and can be formed like a piston ring.

The retention element 21 and/or the securing ring 32 may include a partially or fully peripheral chamfer 39 at an axial end portion of an inner face 38 of the retention element and/or the securing ring, the end portion is then arranged in a direction facing or closest to the thread of the endless screw. At least one identically directed and at least partially or fully peripheral chamfer 40, complementary to the chamfer 39 is located the outer bearing ring 33, and may form part of the groove 35 receiving both the retention element 21 and securing ring 32. Contact between respective chamfers 39, 40 and the radial forces generated by the inwardly biased securing ring 32 generate a pretension force on retention element 21 or the securing ring 32 in a direction axially away from the thread of the endless screw. The retention element 21 can be pretensioned, for example, against a peripheral shoulder on the outer face of the outer bearing ring. Or the securing ring 32 can be pretensioned against the side of the retention element facing the thread of the endless screw.

In another advantageous embodiment, the bearing arrangement 41 includes an outer bearing ring 42 having an axial end portion 44 facing a thread of the endless screw. The axial end portion 44 includes a portion having a smaller outer diameter, see FIG. 4, that forms a peripheral shoulder 45 on the outer face 22 of the outer bearing ring 42 at a portion of the axial end portion 44 facing away from the thread of the endless screw. The retention element 21 fitted on or over the axial end portion 44 of the outer bearing ring 42 and supported axially at one side on the shoulder 45. A peripheral groove 47 formed in an outer face of the axial end portion 44 of the outer bearing ring 42 receives a securing ring 32 arranged at a side of the retention element 21 facing the thread of the endless screw directly adjacent to the retention element 21. The retention element may be constructed, for example, in an annular manner and fitted in a positive-locking manner on the axial end portion 44 of the outer bearing ring 42. The securing ring 32 prevents release of the retention element 21 from the outer bearing ring 42. Again, securing ring 32 is produced from a metal or a metal alloy and can be constructed similar to or the same as a piston ring.

Again, a partially peripheral chamfer 39 is constructed on an axial inner face of the securing ring 32, the axial inner face facing the thread of the endless screw. The peripheral chamfer 39 cooperating with a complementary, partially peripheral chamfer 40 forming part of a groove 35 constructed on the axial end portion 44 of the outer bearing ring 42. Contact between the respective chamfers 39, 40 and radial forces generated by the inwardly biased securing ring 32 pretensions the securing ring and retention element 21 axially away from the thread of the endless screw. As shown in FIG. 4, the securing ring 32 is pretensioned against the side of the retention element 21 facing the thread of the endless screw.

According to another advantageous embodiment, a groove 54 in the outer bearing ring 52 engages the retention element 55 in a positive-locking, no relative movement, manner. The arrangement constituting a structurally simple embodiment. The retention element 55, is not constructed as a closed ring. For example, the retention element 55 may have a plurality of retention element portions arranged in a peripherally offset manner relative to each other on the outer bearing ring or can be constructed in a U-shaped manner.

A chamfer 39 constructed or formed on an end of a radial inner surface 38 of the retention element 55, the chamfer 39 facing the thread of the endless screw, wherein a complementary chamfer 40, forming part of the groove 54 cooperates with the chamfer 39. Because of the contact of the chamfers 39, 40 and the retention element biased inward, toward the longitudinal center axis 23, generating a radial force, the retention element 55 is pretensioned axially away from the thread of the endless screw and against an outer face of the groove 54, the outer face 56b contacts the corresponding outer face of the groove 54. As shown, the retention element 55 is pretensioned against the outer side wall of the groove, the side wall on the left and furthest from the thread of the endless screw.

According to another advantageous embodiment, the retention element 55 has at least two retention element portions 56 arranged in a peripherally offset manner relative to each other on the radial bearing 53. The retention element portions 56 arranged, for example, on the radial bearing uniformly, peripherally offset relative to each other.

Another advantageous embodiment provides for the retention element to be constructed in a disk-like manner, be arranged on the radial bearing in an at least partially peripheral manner, be produced at least partially from a spring steel, and have at least one partially peripheral material recess. Constructing the retention element is constructed in a disk-like manner means the retention element has a relatively small material thickness, in the direction of the longitudinal axis of the radial bearing, in comparison with the other dimensions thereof and has planar main, inner and outer, faces. The retention element can be arranged partially or completely peripherally on the radial bearing. The retention element can be arranged and constructed wherein it does not project axially beyond the axial ends of the radial bearing. Producing the retention element from a spring steel confers a desired resilience property on the retention element. Selecting the number, the shaping, and the relative arrangement of the material recesses or openings, allows optimal adjustment of the resilience or pretensioning properties of the retention element.

The advantages mentioned above regarding the bearing arrangement are connected with the steering gear. The steering gear according to the invention is constructed as a worm gear. The steering gear according to the invention may further have a movable bearing, via which an additional end portion of the endless screw is supported. There can be constructed on the gear housing at least one limiting projection, with which the movability of the movable bearing within the gear housing is limed.

According to an advantageous embodiment, a peripherally arranged shoulder 57 is constructed on the gear housing 49. An inner side 56a of a retention element portion 56 axially abuts the shoulder 57. A radial outer surface 58 of the retention element 55 tapers conically inward, toward the thread of the endless screw. The gear housing 49 includes a complementary, inwardly tapered conical, peripheral contact face 59 of the gear housing 49 that contacts the tapered radial outer surface 58 of the retention element 55. As shown the respective tapers extend radially inwardly toward the longitudinal center axis 23. Because of the tapered construction of the radial outer surface 58 of the retention element 55 and the contact face 59 of the gear housing 49, a radially inwardly directed force is applied to the retention element 55, whereby the retention element 55 is clamped between the contact face 59 and the outer bearing ring 52 of the radial bearing 53. An inner thread 60 can be formed in a portion of the contact face 59, facing away from the thread of the endless screw, opposite the shoulder 57. The inner thread 60 receiving an additional component having an outer thread, which as rotated urges the retention element 55 toward shoulder 57 to pretension it against the radially inwardly directed, peripheral shoulder 57 on the gear housing 49.

According to another advantageous embodiment, the retention element 67 has a U-shape with two members 68 connected to each other with their free end portions fixed at locations 69 to the gear housing. The retention element 67 arranged on the gear housing such that base portion 72 of the retention element 67 connecting the two members 68 is on one side of the outer bearing ring 66.

As explained, the invention provides an optimized bearing that reduces play and needed structural space.

The description of the invention is merely exemplary in nature and variations that do not depart from the gist of the invention are within the scope of the invention. Such variations are not to be regarded as a departure from the spirit and scope of the invention.

What is claimed is:

1. A bearing arrangement, for supporting an endless screw of a steering gear on a gear housing of the steering gear, comprising:
    a radial bearing, said radial bearing having an inner bearing ring, an outer bearing ring connected to the endless screw, and a roller member located between and contacting the inner bearing ring and outer bearing ring;
    a resilient retention element connecting the radial bearing to the gear housing, the retention element disposed in a groove in an outer face of the outer bearing ring, the retention element fixed in the groove in the outer face of the outer bearing ring in an axially non-movable manner with respect to a longitudinal center axis of the radial bearing.

2. The bearing arrangement of claim 1 wherein the retention element and the outer bearing ring is fixed using a bayonet-type closure.

3. The bearing arrangement of claim 2 including a securing ring, the securing ring arranged at a side of the retention element facing a thread of the endless screw adjacent to the retention element.

4. The bearing arrangement of claim 1 wherein the retention element has a plurality of retention element portions arranged in a peripherally offset manner relative to each other on the radial bearing.

5. The bearing arrangement of claim 1 wherein the retention element has a disk-like configuration manner having a partially peripheral recess and produced at least partially from a spring.

6. A bearing arrangement, for supporting an endless screw of a steering gear on a gear housing of the steering gear, comprising:
    a radial bearing connected to the endless screw;
    a resilient retention element connecting the radial bearing to the gear housing, the retention element connected to an outer face of an outer bearing ring, the retention element fixed to the outer face of the outer bearing ring in an axially non-movable manner with respect to a longitudinal center axis of the radial bearing, wherein the retention element and the outer bearing ring is fixed using a bayonet-type closure;
    a securing ring engaging a groove formed peripherally in the outer face of the outer bearing ring, the securing ring arranged at a side of the retention element facing a thread of the endless screw adjacent to the retention element; and wherein at least one of the retention element and the securing ring includes a chamfer formed at an axial end portion of an inner face of thereof, the end portion facing the thread of the endless screw; and
the chamfer complementary to and cooperating with a chamfer in the groove on the outer bearing ring.

7. A bearing arrangement, for supporting an endless screw of a steering gear on a gear housing of the steering gear, comprising:
    a radial bearing, said radial bearing having an inner bearing ring, an outer bearing ring connected to the endless screw, and a roller member located between and contacting the inner bearing ring and outer bearing ring;
    a resilient retention element connecting the radial bearing to the gear housing, the retention element contacting an outer face of the outer bearing ring in an axially non-movable manner with respect to a longitudinal center axis of the radial bearing;
    wherein the outer bearing ring has an axial end portion, the axial end portion having an outer diameter smaller than an outer diameter of the outer bearing ring, a peripheral shoulder formed on the outer face of the outer bearing ring between the respective outer diameters;
    the retention element disposed on the axial end portion of the outer bearing ring and supported axially at one side on the shoulder;
    a peripheral groove formed in an outer face of the axial end portion of the outer bearing ring; and
    a securing ring disposed in the groove, the securing ring adjacent the retention element.

8. The bearing arrangement of claim 7 wherein the securing ring includes a chamfer at an axial end portion of an inner covering face of the securing ring, the axial end portion facing the thread of the endless screw; and
    a chamfer on the axial end portion of the outer bearing ring that cooperates with a chamfer on the peripheral groove.

9. A bearing arrangement, for supporting an endless screw of a steering gear on a gear housing of the steering gear, comprising:
    a radial bearing, said radial bearing having an inner bearing ring connected to the endless screw, an outer bearing ring, and a roller member located between and contacting the inner bearing ring and outer bearing ring;
    a resilient retention element connecting the outer bearing ring of the radial bearing to the gear housing, the retention element contacting an outer face of the outer bearing ring in an axially non-movable manner with respect to a longitudinal center axis of the radial bearing;
    wherein the outer face of the outer bearing ring has a peripheral groove; and
    the retention element fits in the peripheral groove in a positive-locking manner.

10. The bearing arrangement of claim 9 including said retention element having a chamfer and the groove having a chamfer, said retention element chamfer and the groove chamfer complementary and engaging one another.

11. A steering gear, for an electrical power-assisted steering system of a vehicle having a gear housing and an endless screw arranged in the gear housing, comprising:
    a bearing arrangement rotatably supporting the endless screw in the gear housing;

a recess in the housing, the recess including contact surface and a shoulder, the contact surface tapering radially inward;

a retention element disposed in the recess, wherein an outer face of the retention element, having a complementary radially inward taper, engages the contact surface and a surface of the retention element contact shoulder; and wherein the retention element has a U-shape including two leg members connected by a base member, the leg members fixed to the gear housing.

12. The steering gear of claim 11 including a radial bearing;

the retention element fixed to an outer face of an outer bearing ring in an axially non-movable manner with respect to a longitudinal center axis of the radial bearing.

13. The steering gear of claim 12 including a securing ring engaging a groove formed peripherally in the outer face of the outer bearing ring, the securing ring arranged at a side of the retention element facing a thread of the endless screw adjacent to the retention element.

14. A steering gear bearing system comprising;

a radial bearing having an outer bearing ring, an inner bearing ring, and a roller member between and contacting both the outer bearing ring and the inner bearing ring, the outer bearing ring having an outer surface;

a recess in the outer surface of said outer bearing ring, said recess forming a shoulder;

a resilient retention element in the recess and contacting said shoulder and fixed against relative axial movement, between said outer bearing ring and said retention element along the longitudinal center axis of the radial bearing.

15. The steering gear bearing system of claim 14 including said recess in the outer bearing ring forms a groove, a side of said groove forming said shoulder.

16. The steering gear bearing system of claim 15 including a securing ring disposed in said groove adjacent said retention element wherein said securing ring engages a second side of said groove.

17. The steering gear bearing system of claim 15 including said outer bearing ring having a groove spaced from said shoulder; and a securing ring, said securing ring disposed in said groove and engaging said retention element.

* * * * *